United States Patent
Govindjee et al.

(10) Patent No.: US 11,361,143 B2
(45) Date of Patent: Jun. 14, 2022

(54) PROACTIVE RICH TEXT FORMAT MANAGEMENT

(71) Applicant: INTERNATIONAL BUSINESS MACHINES CORPORATION, Armonk, NY (US)

(72) Inventors: Anita Govindjee, Ithaca, NY (US); Su Liu, Austin, TX (US); Kai Liu, Malden, MA (US); Cheng Xu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 307 days.

(21) Appl. No.: 16/515,068

(22) Filed: Jul. 18, 2019

(65) Prior Publication Data

US 2021/0019364 A1 Jan. 21, 2021

(51) Int. Cl.
*G06F 17/00* (2019.01)
*G06F 40/103* (2020.01)
*G06F 16/34* (2019.01)
*G06F 16/335* (2019.01)
*G06V 40/16* (2022.01)

(52) U.S. Cl.
CPC .......... *G06F 40/103* (2020.01); *G06F 16/337* (2019.01); *G06F 16/34* (2019.01); *G06V 40/174* (2022.01)

(58) Field of Classification Search
CPC ...... G06F 40/103; G06F 16/337; G06F 16/34; G06K 9/00302
See application file for complete search history.

(56) References Cited

U.S. PATENT DOCUMENTS

| | | | |
|---|---|---|---|
| 6,324,511 B1 | 11/2001 | Kiraly et al. | |
| 8,239,763 B1 * | 8/2012 | Fiesinger | G06F 40/103 |
| | | | 715/269 |
| 8,517,739 B2 | 8/2013 | Dekkers | |
| 8,898,595 B2 | 11/2014 | Cragun et al. | |
| 9,672,618 B1 * | 6/2017 | Hassanain | G16H 50/20 |
| 10,733,235 B2 * | 8/2020 | Henery | G06F 40/109 |

(Continued)

FOREIGN PATENT DOCUMENTS

WO 2018006038 A1 1/2018

OTHER PUBLICATIONS

Benfatto, Mattias Nilsson et al. "Screening for Dyslexia Using Eye Tracking during Reading"; PLOS / One a Peer-Reviewed Open Access Journal, PLoS One 2016; 11(12); Published online Dec. 9, 2016; retrieved from URL: https://www.ncbi.nlm.nih.gov/pmc/articles/PMC5147795/ ; 20 pgs.

(Continued)

*Primary Examiner* — Mohammed H Zuberi
(74) *Attorney, Agent, or Firm* — Cantor Colburn LLP; Jorge Maranto

(57) ABSTRACT

Embodiments of the present invention are directed to a computer-implemented method for proactive rich text format management. Aspects include obtaining a content item to be displayed to a user and obtaining a preferred rich text format template for the user. Aspects also include applying the preferred rich text format template to the content item to create a customized view of the content item and displaying the customized view of the content item to the user.

18 Claims, 6 Drawing Sheets

(56) References Cited

U.S. PATENT DOCUMENTS

| | | | | |
|---|---|---|---|---|
| 2010/0275161 | A1* | 10/2010 | DiCamillo | G06F 40/103 715/810 |
| 2011/0111377 | A1 | 5/2011 | Dekkers | |
| 2013/0212469 | A1* | 8/2013 | Tian | G06F 40/154 715/236 |
| 2015/0220503 | A1* | 8/2015 | Landau | G06F 15/0291 715/256 |
| 2015/0286621 | A1* | 10/2015 | Henery | G06F 40/109 704/271 |
| 2016/0322028 | A1* | 11/2016 | Windridge | G16H 40/63 |
| 2016/0378720 | A1* | 12/2016 | Bacus | G06F 40/103 715/251 |
| 2017/0060814 | A1* | 3/2017 | Kohlmeier | G06F 3/0484 |
| 2018/0322798 | A1* | 11/2018 | Kalva | G06N 20/00 |
| 2019/0340232 | A1* | 11/2019 | Shanmugam | H04N 7/183 |

OTHER PUBLICATIONS

Eysenbach, Gunther "A Digital App to Aid Detection, Monitoring, and Management of Dyslexia in Young Children (DIMMAND): Protocol fora Digital Health and Education Solution" JMIR Res Protoc. May 2018; 7(5); Published online May 17, 2018; retrieved from URL: https://www.ncbi.nlm.nih.gov/pmc/articles/PMC5981053/ ; 10 pgs.

Grandmother Diaries "#Dyslexie Font: Aid for #Dyslexia", retrieved from URL: http://grandmotherdiaries.com/dyslexie-font-aid-dyslexia/ ; undated; retrieved from Internet: Jun. 5, 2019; 6 pgs.

Mell, et al. "The NIST Definition of Cloud Computing" NIST National Institute of Standards and Technology, U.S. Dept of Commerce, Special Publication 800-145; Sep. 2011; 7 pgs.

Patreon OpenDyslexic "A Typeface for Dyslexia"; undated; Retrieved from URL: https://opendyslexic.org/ on Jun. 5, 2019; 2 pgs.

Rello, Luz et al. "Optimal Colors to Improve Readability for People with Dyslexia"; W3C Web Accessibility initiative; Nov. 12, 2019; Retrieved from URL: http://www.w3.org/WAI/RD/2012/text-customization/r11 ; 7 pgs.

Rendle, Robin "Color Fonts Demo", retrieved from Internet on Jun. 5, 2019; URL: https://codepen.io/robinrendle/pen/YpxXLx; 1 pg.

Snowling, Margaret J. et al. "Annual Research Review: The nature and classification of reading disorders—a commentary on proposals for DSM-5", Wiley, J. Chiled Psychol. Pschiatry; May 2012; 53(5): 593-607; retrieved from URL: https://www.ncbi.nlm.nih.gov/pmc/articles/PMC3492851/ ; 23 pgs.

Texas Education Agency "The Dyslexia Handbook" Revised 2014; Procedures Concerning Dyslexia and Related Disorders; Texas Education Agency, Jul. 2014; 182 pgs.

Uccula, Arcangelo et al. "Colors, colored overlays, and reading skills"; Frontiers in Psychology, 2014; 5: 833; published online Jul. 29, 2014; retrieved from URL: https://www.ncbi.nlm.nih.gov/pmc/articles/PMC4114255/ ; 8 pgs.

* cited by examiner

PROACTIVE RICH TEXT FORMAT MANAGEMENT

BACKGROUND

The present invention generally relates to controlling the appearance of text and more specifically, to proactive rich text format management based on a reader's ability.

In general, the appearance of text, such as the font style, color, and size, impacts the ability of a user to quickly and easily read and understand the text. The impact of the appearance of text on the user's ability to read and understand the text is particularly high for individuals that have a reading disability, such as Dyslexia. Dyslexia is a learning disorder that involves difficulty reading due to problems identifying speech sounds and learning how they relate to letters and words.

SUMMARY

Embodiments of the present invention are directed to a computer-implemented method for proactive rich text format management. A non-limiting example of the computer-implemented method includes translating a content item. The method includes obtaining a content item to be displayed to a user and obtaining a preferred rich text format template for the user. The method also includes applying the preferred rich text format template to the content item to create a customized view of the content item and displaying the customized view of the content item to the user.

Embodiments of the present invention are directed to a system for proactive rich text format management. A non-limiting example of the system includes a processor and a memory communicatively coupled to the processor. The memory has stored therein instructions that when executed cause the processor to obtain a content item to be displayed to a user and to obtain a preferred rich text format template for the user. The instructions also cause the processor to apply the preferred rich text format template to the content item to create a customized view of the content item and to display the customized view of the content item to the user.

Embodiments of the invention are directed to a computer program product for proactive rich text format management, the computer program product having a computer readable storage medium having program instructions embodied therewith. The program instructions are executable by a processor to cause the processor to perform a method. A non-limiting example of the method includes obtaining a content item to be displayed to a user and obtaining a preferred rich text format template for the user. The method also includes applying the preferred rich text format template to the content item to create a customized view of the content item and displaying the customized view of the content item to the user.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
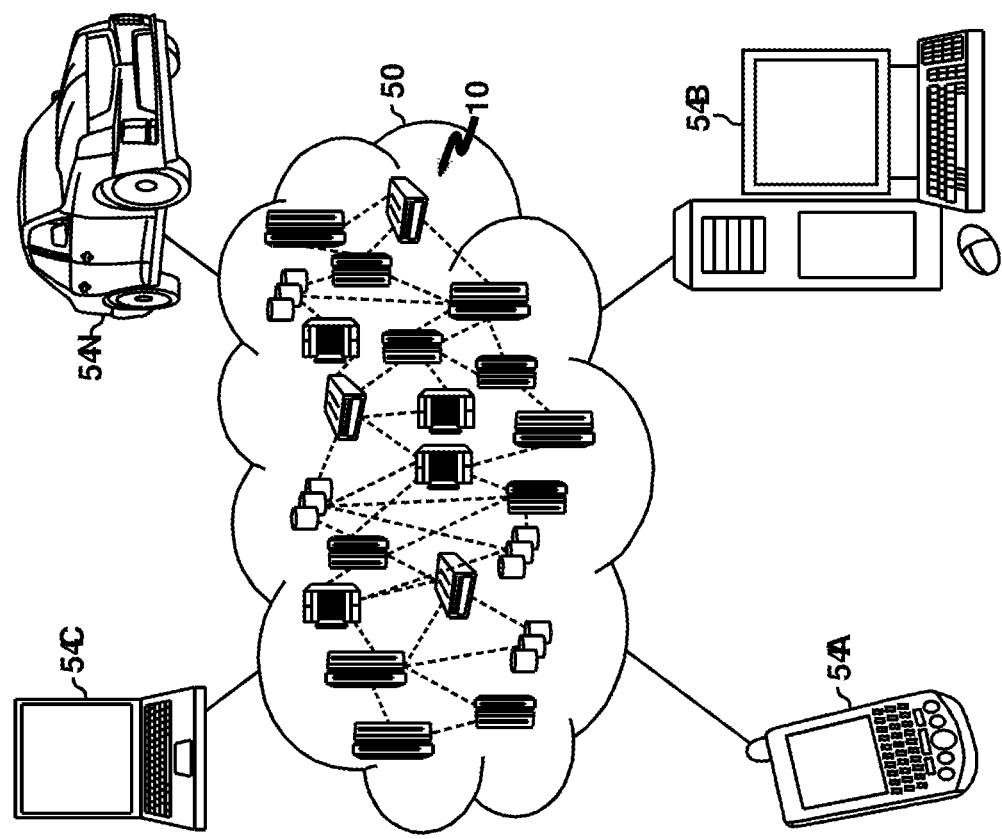
FIG. 1 depicts a cloud computing environment according to an embodiment of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
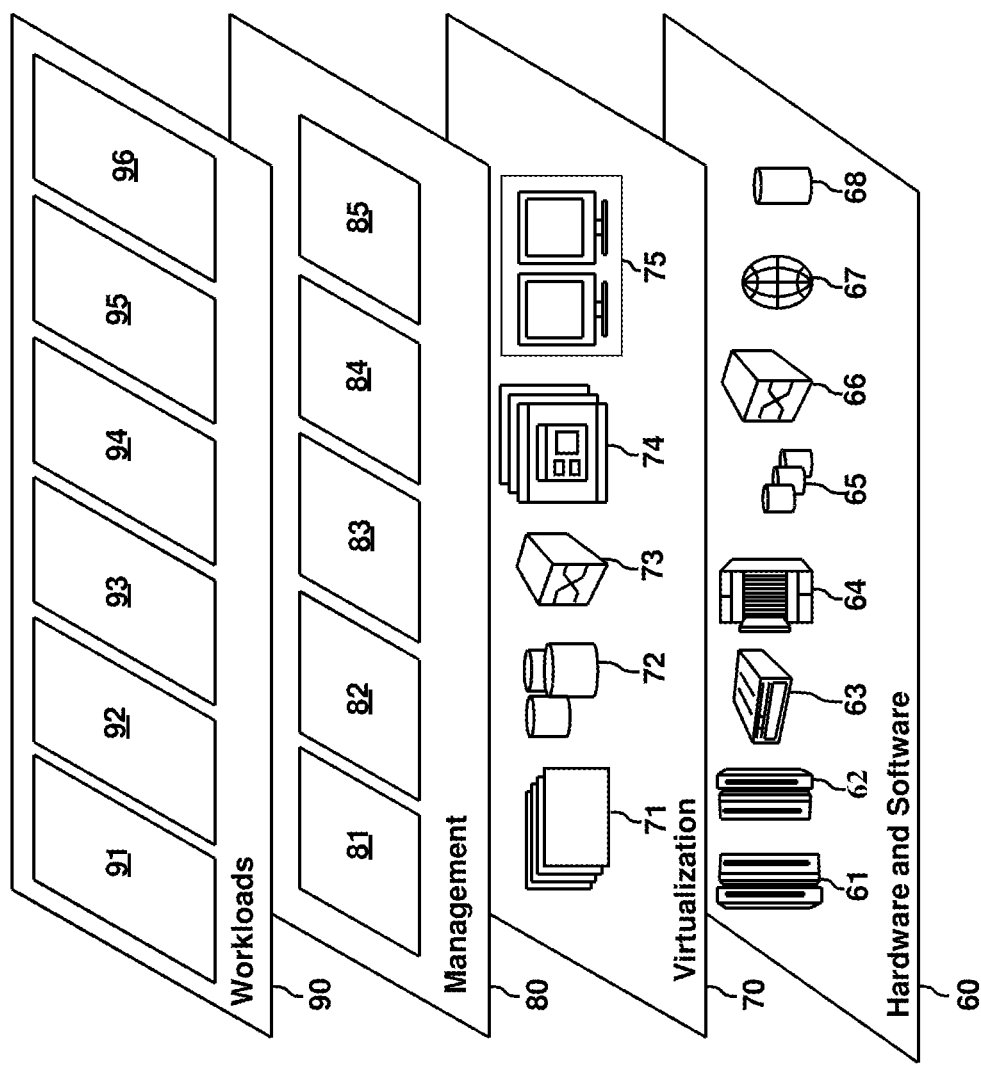
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; CAN processing 95; and proactive rich text format management 96.

Figure 3:
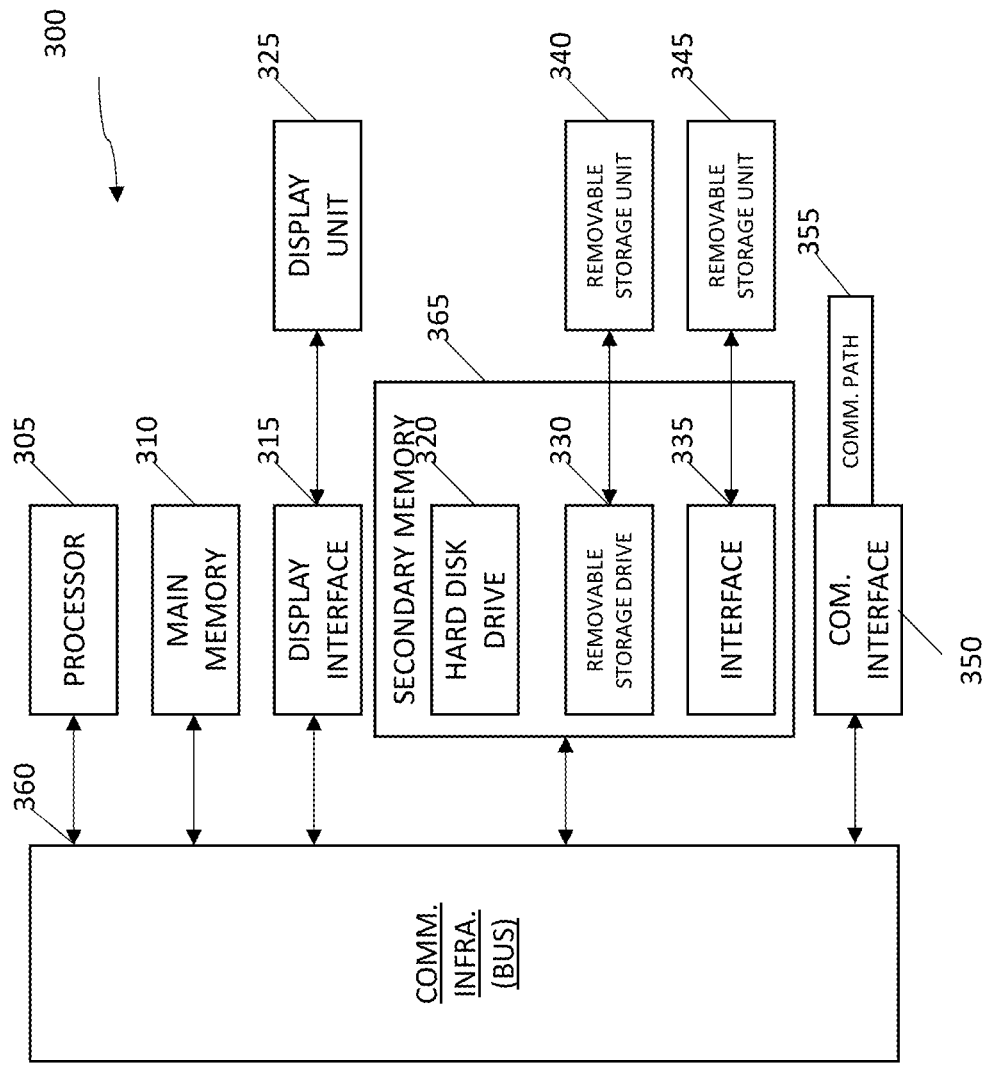
FIG. 3 depicts a high-level block diagram computer system, which can be used to implement one or more aspects of the present invention.

FIG. 3 depicts a high-level block diagram computer system 300, which can be used to implement one or more aspects of the present invention. More specifically, computer system 300 can be used to implement some hardware components of embodiments of the present invention. Although one exemplary computer system 300 is shown, computer system 300 includes a communication path 355, which connects computer system 300 to additional systems (not depicted) and can include one or more wide area networks (WANs) and/or local area networks (LANs) such as the Internet, intranet(s), and/or wireless communication network(s). Computer system 300 and additional system are in communication via communication path 355, e.g., to communicate data between them.

Computer system 300 includes one or more processors, such as processor 305. Processor 305 is connected to a communication infrastructure 360 (e.g., a communications bus, cross-over bar, or network). Computer system 300 can include a display interface 315 that forwards graphics, text, and other data from communication infrastructure 360 (or from a frame buffer not shown) for display on a display unit 325. Computer system 300 also includes a main memory 310, preferably random access memory (RAM), and can also include a secondary memory 365. Secondary memory 365 can include, for example, a hard disk drive 320 and/or a removable storage drive 330, representing, for example, a floppy disk drive, a magnetic tape drive, or an optical disk drive. Removable storage drive 330 reads from and/or writes to a removable storage unit 340 in a manner well known to those having ordinary skill in the art. Removable storage unit 340 represents, for example, a floppy disk, a compact disc, a magnetic tape, or an optical disk, etc. which is read by and written to by removable storage drive 330. As will be appreciated, removable storage unit 340 includes a computer readable medium having stored therein computer software and/or data.

In alternative embodiments, secondary memory 365 can include other similar means for allowing computer programs or other instructions to be loaded into the computer system. Such means can include, for example, a removable storage unit 345 and an interface 335. Examples of such means can include a program package and package interface (such as that found in video game devices), a removable memory chip (such as an EPROM, or PROM) and associated socket, and other removable storage units 345 and interfaces 335 which allow software and data to be transferred from the removable storage unit 345 to computer system 300.

Computer system 300 can also include a communications interface 350. Communications interface 350 allows software and data to be transferred between the computer system and external devices. Examples of communications interface 350 can include a modem, a network interface (such as an Ethernet card), a communications port, or a PCM-CIA slot and card, etcetera. Software and data transferred via communications interface 350 are in the form of signals which can be, for example, electronic, electromagnetic, optical, or other signals capable of being received by communications interface 350. These signals are provided to communications interface 350 via communication path (i.e., channel) 355. Communication path 355 carries signals and can be implemented using wire or cable, fiber optics, a phone line, a cellular phone link, an RF link, and/or other communications channels.

In the present description, the terms "computer program medium," "computer usable medium," and "computer readable medium" are used to generally refer to media such as main memory 310 and secondary memory 365, removable storage drive 330, and a hard disk installed in hard disk drive 320. Computer programs (also called computer control logic) are stored in main memory 310 and/or secondary memory 365. Computer programs can also be received via communications interface 350. Such computer programs, when run, enable the computer system to perform the features of the present invention as discussed herein. In particular, the computer programs, when run, enable processor 305 to perform the features of the computer system. Accordingly, such computer programs represent controllers of the computer system.

Turning now to an overview of technologies that are more specifically relevant to aspects of the invention, methods, systems and computer program products for Proactive Rich Text Format Management (PRTFM) are provided. In exemplary embodiments, the PRTFM system is configured to identify a preferred rich text format setting for an individual and to render text of a content item using the preferred rich text format to maximize the individual's ability to read and understand the content item. In exemplary embodiments, the preferred rich text format setting for an individual is determined based on a user profile. In exemplary embodiments, the preferred rich text format includes one or more of a preferred text size, font color, font style, glyph, background color, orientation, and the like. In exemplary embodiments, the preferred rich text format includes different formats that are applied to different letters such that all of the letters of a word do not include the same preferred rich text format.

In exemplary embodiments, the PRTFM system is configured to monitor a user as the user reads the text of a content item and to evaluate the reading performance of the user. The PRTFM system is further configured to make adjustments to the rich text format of the text of the content item to improve the reading performance of the user. The changes to the rich text format are uploaded and saved to the user profile.

Figure 4:
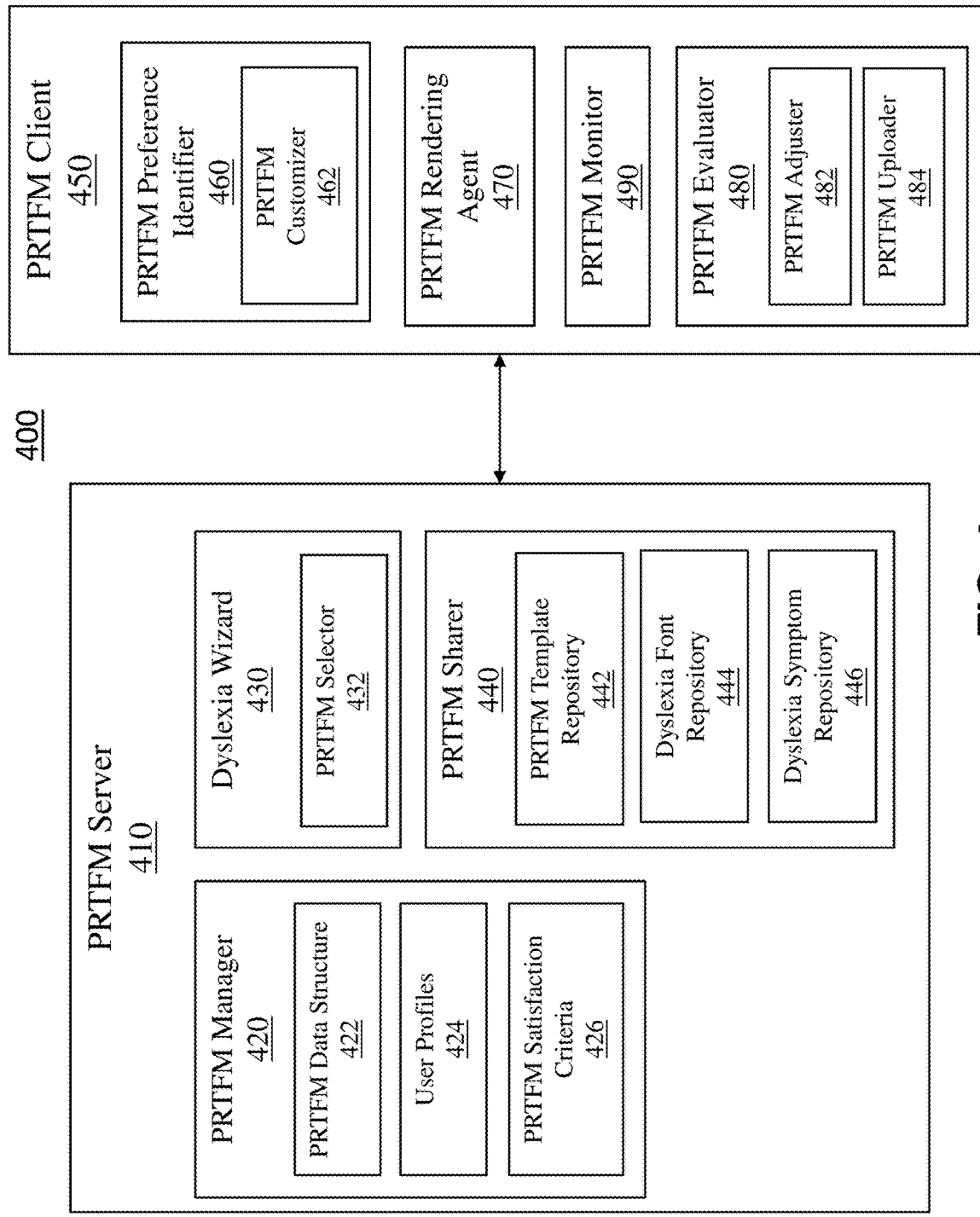
FIG. 4 depicts a block diagram of a system for proactive rich text format management in accordance with an embodiment of the present invention.

Referring now to FIG. 4, a block diagram of a system 400 for proactive rich text format management in accordance with an embodiment of the present invention is shown. The PRTFM system 400 includes a PRTFM server 410 and a PRTFM client 450. In exemplary embodiments, the PRTFM server 410 is embodied in a cloud computing system such as the ones shown in FIGS. 1-2 and the PRTFM client 450 is embodied in a computer system such as the one shown in FIG. 3. In another embodiment, both the PRTFM server 410 and the PRTFM client 450 are embodied in a cloud computing system such as the ones shown in FIGS. 1-2.

As illustrated the PRTFM server 410 is a server application for receiving PRTFM client requests and returning a user preferred layout. The PRTFM server 410 includes a PRTFM manager 420, a dyslexia wizard 430, and a PRTFM sharer 440. The PRTFM manager 420 is a user interface for configuring and managing the PRTFM system. The PRTFM manager 420 allows a user to enable/disable the PRTFM service and to select dyslexia types (such as visual dyslexia, rapid naming deficit, surface dyslexia, etc.) and related levels. In addition, the PRTFM manager 420 allows users to change certain letters' font type, size, color, etc., and to make adjustments to the PRTFM algorithm. For example, to change and evaluate the preferences sentence-by-sentence, paragraph-by-paragraph, page-page, or articles. Furthermore, the PRTFM manager 420 allows a user to define PRTFM satisfaction criteria, such as reading speed, facial expression, biometric data analysis, etc.

In exemplary embodiments, the PRTFM manager 420 includes a PRTFM Data Structure 422, user profiles 424 and PRTFM satisfaction criteria 426. The PRTFM Data Structure 422 is a data structure for defining PRTFM data types and structure with related algorithms for adjusting PRTFM parameters according to the dyslexia type and level. For instance, a PRTFM_Data included: (UserID, DocumentInfo [FileName, FilePath, ParagraphID, SentenceID, StartingOffset, EndingOffset, Content], DyslexiaFormat[PreferredFontName, PreferredFontStyle, PreferredFontSize, PreferedFontColor, PreferedBackgroundColor], DyslexiaInfo[Type, Level], etc.). The user profiles 424 are configured to store the dyslexia type and level for each user and also store a preferred rich text format setting for each user. The PRTFM satisfaction criteria 426 stores the metrics that are used to evaluate the reading performance of a user, such as reading speed, facial expression, biometric data analysis, etc.

In exemplary embodiments, the PRTFM server 410 includes a dyslexia wizard 430, which is a program for receiving a user's information, then determining and return the user's PRTFM preferences according to a registered/detected user's dyslexia type and level. The dyslexia wizard 430 includes a PRTFM selector 432 which is a module for selecting and applying one of the suitable PRTFM templates for the user in the current reading section. In one embodiment, the PRTFM selector 432 is configured to display an image and several different rich text formats of a word describing the image and to receive a user selection of the rich text formats that the user most easily understands. Based on the user-provided data, the dyslexia wizard 430 can determine a type and level of dyslexia that the user has. In another example, the PRTFM selector 432 is configured to receive user input of the type and level of dyslexia that the user has. For example, the user may input a dyslexia type and level that were provided during a professional diagnosis.

Returning to FIG. 4, in exemplary embodiments, the PRTFM server 410 includes a PRTFM sharer 440, which is a module for sharing the PRTFM templates among multiple users of the PRTFM server 410. The PRTFM sharer 440 includes a PRTFM template repository 442, a dyslexia font repository 444, and a dyslexia symptom repository 446. The PRTFM template repository 442 is a database that includes a set of PRTFM templates for different dyslexia types and levels. Based on a determined type of dyslexia, the PRTFM system 400 can select one of predefined PRTFM template for a reader with the determined type of dyslexia. The dyslexia font repository 444 is a database of dyslexia fonts for dyslexia users to download and install. In another embodiment, the font may be a set of web font in a font server for supporting the different styles of the related dyslexia types and levels. The dyslexia symptom repository 446 is a database of dyslexia symptoms defined, detected, and learned from the users of the PRTFM system 400.

In exemplary embodiments, the PRTFM client 450 is a client application configured to support features of the PRTFM system 400. It can generate a customized dyslexia friendly format over the predefined format for different users with different dyslexia types on different dyslexia levels. The PRTFM client 450 includes a PRTFM preference identifier 460, a PRTFM rendering agent 470, a PRTFM evaluator 480, and a PRFTM monitor 490.

The PRTFM preference identifier 460 is a module that is configured to identify preferred rich text format settings. The PRTFM preference identifier 460 initializes a PRTFM data structure for a new content item and fills out the correlated parameters based on the user profile. The PRTFM preference identifier 460 includes a PRTFM customizer 462, which is a module that is configured for receiving the returned set of the user's PRTFM preferences from PRTFM server 410 according to the user's dyslexia type and level. The PRTFM customizer 462 customizes the predefined text format according to the selected PRTFM template. The customizing operation may include dyslexia font selection, download, reload, reset, and the like.

In exemplary embodiments, the PRTFM rendering agent 470 is a module that is configured to dynamically render the customized rich text document being displayed to the user. In one embodiment, the PRTFM rendering agent 470 is a plug-in to a web-browser or text editing program. In another embodiment, the PRTFM rendering agent 470 is a stand-alone program. The PRTFM monitor 490 is a module that is configured to monitor the user reading reactions. The reading reactions may include reading speed, recognized facial expressions, biometric data, and the like. The PRTFM monitor 490 can utilize known eye tracking algorithms and facial recognition to monitor the user while the user is reading.

In exemplary embodiments, the PRTFM evaluator 480 is a module that is configured to evaluate the current reading performance on the current selected PRTFM format. The evaluation may be based on overall the reading reaction data or certain selected reactions. For instance, an overall comfortable reading index can be defined as needed to quantify PRTFM changes. The comfortable reading index (CRI) may be calculated based on reading speed, facial expression, and the like. In exemplary embodiments, the comfortable reading index is calculated based on metrics obtained from the user profile. For example, the user profile can include a desired reading speed, a desired maximum dwell time on a single word, a threshold number of unhappy or frustrated facial expressions per minute, or the like. The comfortable reading index is calculated as a weighted average of the user provided metrics. The PRTFM adjuster 482 is a module that is configured to adjust the rich text format template that is applied to the text that is being displayed to the user. The PRTFM uploader 484, is a module that is configured to upload any adjustments made to the rich text format into the PRTFM template to the PRTFM server 410.

Figure 5:
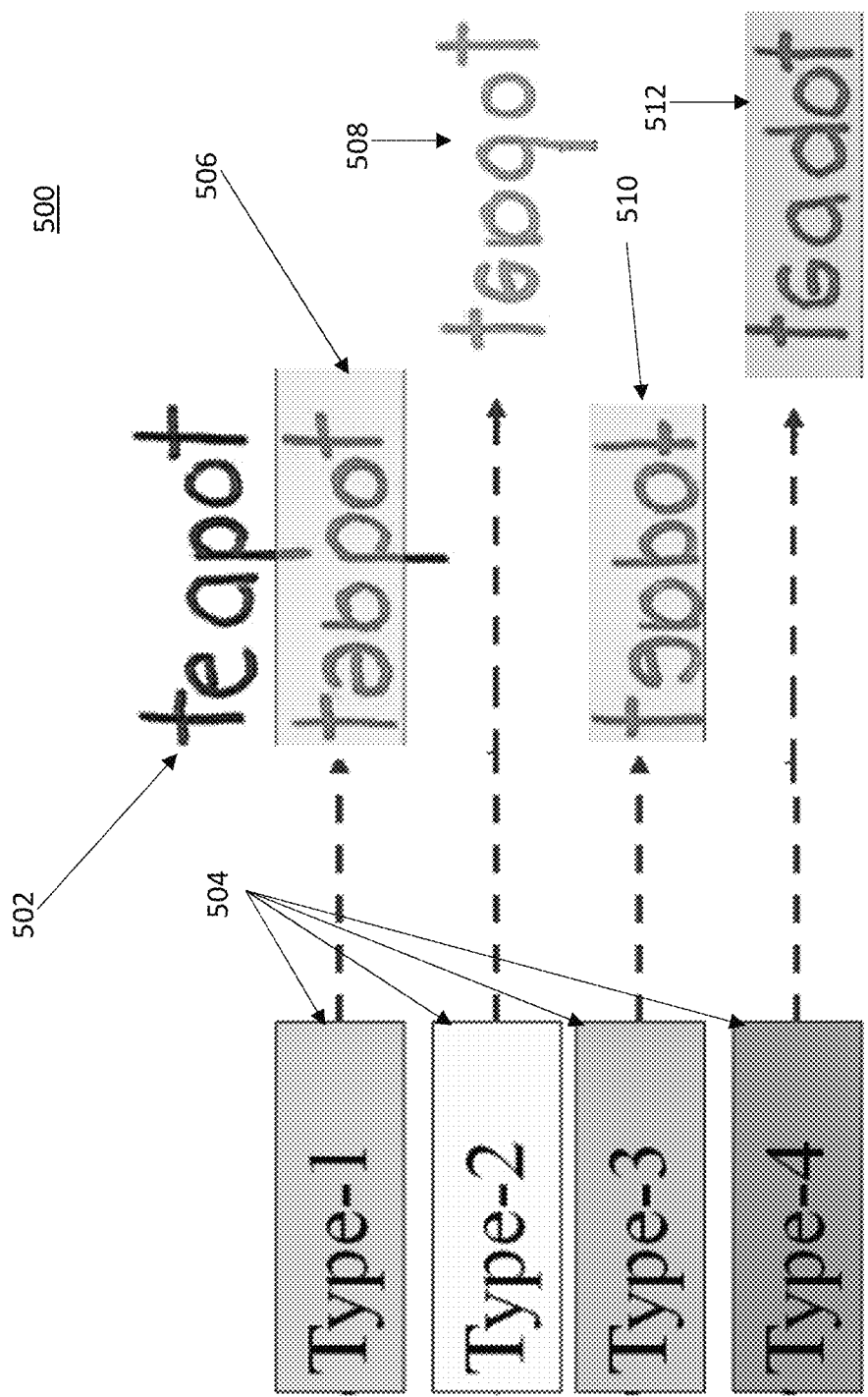
FIG. 5 depicts a diagram of a user interface for training a proactive rich text format management system in accordance with an embodiment of the present invention.

Referring now to FIG. 5, a diagram of a user interface 500 for training a proactive rich text format management system in accordance with an embodiment of the present invention is shown. As shown, the user interface 500 includes a word 502 that includes standard text and a plurality of rendering formats 506, 508, 510, and 512 that are each the word 502 rendered using a different rich text format template. As a result, the font characteristics, i.e., the font type, font style (italicized, bold, underlined, etc.), orientation, font color, font size, background color, and the like of each rendering format 506, 508, 510, and 512 are different. As illustrated, the characters within each rendering format 506, 508, 510, and 512 can also have different font characteristics from one another according to the different dyslexia types 504. In another embodiment, an image of an item can be used in place of the word 502. For example, an image of a teapot can be shown in place of the word teapot.

The user interface 500 also includes a plurality of selection icons 502 that are used to indicate which of the plurality of rendering formats 506, 508, 510, and 512 the user most easily understands or comprehends. In exemplary embodiments, the user interface 500 is configured to display a series of words (or images) 502 and to the user and the responses provided by the user are used to identify a type 504 and level of dyslexia that the user has and to thereby identify a preferred rich text format template for the user.

Figure 6:
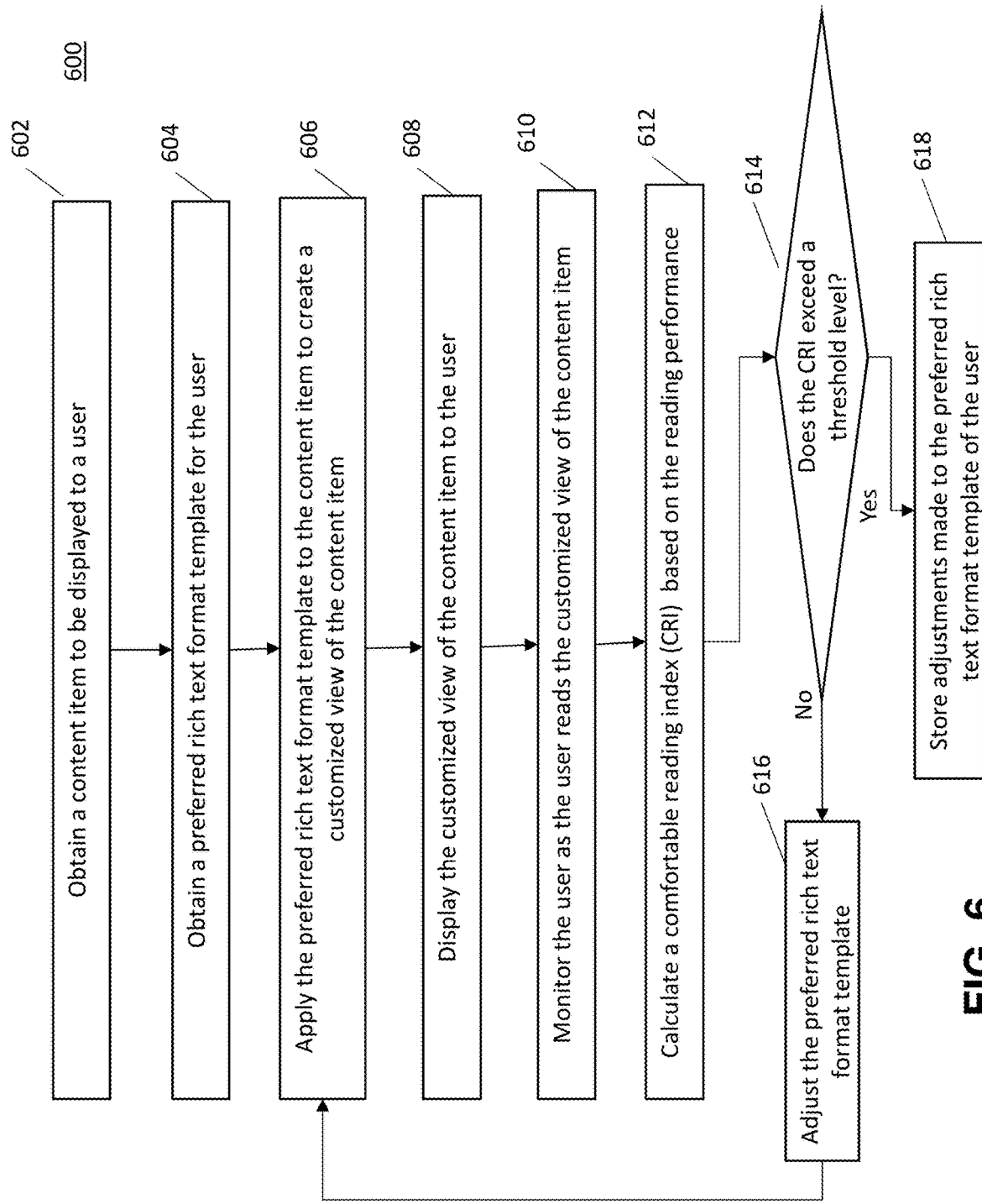
FIG. 6 depicts a flow diagram of a method for proactive rich text format management in accordance with an embodiment of the present invention.

Referring now to FIG. 6, a flow diagram of a method 600 for proactive rich text format management in accordance with an embodiment of the present invention is shown. As illustrated at block 602, the method 600 includes obtaining a content item to be displayed to a user. In exemplary embodiments, the content item can be a webpage, an electronic book, a newspaper, or the like. Next, as shown at block 604, method 600 includes obtaining a preferred rich text format template for the user. In exemplary embodiments, the preferred rich text format template is obtained based on a stored user profile of the user. In one embodiment, the user profile includes a type and a level of dyslexia of the user and wherein the preferred rich text format template is determined based on the type and the level of dyslexia. In one embodiment, the type and the level of dyslexia can be entered into the user profile by the user. In another embodiment, the type and the level of dyslexia are determined by the proactive rich text format management system based on the user selecting a series of words that are best understood by the user.

The method 600 also includes applying the preferred rich text format template to the content item to create a customized view of the content item, as shown at block 606. In exemplary embodiments, the preferred rich text format template includes a font style, a font color, a font size, a background color, and an orientation for each character in the alphabet. The customized view of the content item includes at least one word that has letters rendered with different font characteristics. Next, as shown at block 608, the method 600 includes displaying the customized view of the content item to the user.

In exemplary embodiments, the method 600 also includes monitoring the user as the user reads the customized view of the content item, as shown at block 610. In one embodiment, the monitoring is performed using a camera to capture images and/or video of the user, algorithms that analyze the facial expressions of the user, and algorithms that track the eye movements of the user. As will be appreciated by those of ordinary skill in the art, other methods can be used to monitor the user as they read the content item. Next, as shown at block 612, the method 600 includes calculating a comfortable reading index based on a reading performance of the user. In exemplary embodiments, the comfortable reading index is calculated based on metrics obtained from the user profile. For example, the user profile can include a desired reading speed, a desired maximum dwell time on a single word, a threshold number of unhappy or frustrated facial expressions per minute, or the like. The comfortable reading index is calculated as a weighted average of the user provided metrics or administrators or supervisors define calculation methods based on different dyslexia types and levels.

As shown at decision block 614, the method 600 includes determining if the comfortable reading index exceeds a threshold level. In exemplary embodiments, the threshold level is obtained based on the user profile and can be set by the user. If the comfortable reading index does not exceed a threshold level, the method 600 proceeds to block 616 and adjust the preferred rich text format template. The method 600 returns to block 606. If the comfortable reading index does exceed a threshold level, the method 600 proceeds to block 618 and any adjustments that have been made to the preferred rich text format template are stored.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for proactive rich text format management comprising:
    obtaining a content item to be displayed to a user;
    obtaining a preferred rich text format template for the user, wherein the preferred rich text format template includes an orientation for each character in the alphabet;

applying the preferred rich text format template to the content item to create a customized view of the content item; and displaying the customized view of the content item to the user, wherein the customized view of the content item includes at least one word that includes letters rendered with a different orientation from other letters in the at least one word.

2. The computer-implemented method of claim 1, wherein the preferred rich text format template is obtained based on a user profile associated with the user.

3. The computer-implemented method of claim 2, wherein user profile includes a type and a level of dyslexia of the user and wherein the preferred rich text format template is determined based on the type and the level of dyslexia.

4. The computer-implemented method of claim 1, further comprising:

monitoring the user as the user reads the customized view of the content item; and calculating a comfortable reading index based on a reading performance of the user.

5. The computer-implemented method of claim 4, further comprising:

based on a determination that the comfortable reading index is below a threshold level, iteratively:

adjusting the preferred rich text format template that is applied and updating the customized view of the content item to the user;

evaluating the reading performance of the user; and calculating a new comfortable reading index based on the reading performance until the new comfortable reading index exceeds the threshold level.

6. The computer-implemented method of claim 5, further comprising storing the adjustments made to the preferred rich text format template of the user.

7. The computer-implemented method of claim 1, wherein the preferred rich text format template further includes a font style, a font color, a font size, and a background color for each character in the alphabet.

8. A system comprising:

a processor;

a memory communicatively coupled to the processor, the memory having stored therein instructions that when executed cause the processor to:

obtain a content item to be displayed to a user;

obtain a preferred rich text format template for the user, wherein the preferred rich text format template includes an orientation for each character in the alphabet;

apply the preferred rich text format template to the content item to create a customized view of the content item; and display the customized view of the content item to the user, wherein the customized view of the content item includes at least one word that includes letters rendered with a different orientation from other letters in the at least one word.

9. The system of claim 8, wherein the preferred rich text format template is obtained based on a user profile associated with the user.

10. The system of claim 9, wherein user profile includes a type and a level of dyslexia of the user and wherein the preferred rich text format template is determined based on the type and the level of dyslexia.

11. The system of claim 8, wherein when executed the instructions further cause the processor to:

monitor the user as the user reads the customized view of the content item; and calculate a comfortable reading index based on a reading performance of the user.

12. The system of claim 11, wherein when executed the instructions further cause the processor to:

based on a determination that the comfortable reading index is below a threshold level, iteratively:

adjust the preferred rich text format template that is applied and updating the customized view of the content item to the user;

evaluate the reading performance of the user; and calculate a new comfortable reading index based on the reading performance until the new comfortable reading index exceeds the threshold level.

13. The system of claim 8, wherein the preferred rich text format template further includes a font style, a font color, a font size, and a background color for each character in the alphabet.

14. A computer program product for translating a content item, the computer program product comprising a computer readable storage medium having program instructions embodied therewith, the program instructions executable by a processor to cause the processor to:

obtain a content item to be displayed to a user;

obtain a preferred rich text format template for the user, wherein the preferred rich text format template includes an orientation for each character in the alphabet;

apply the preferred rich text format template to the content item to create a customized view of the content item; and display the customized view of the content item to the user, wherein the customized view of the content item includes at least one word that includes letters rendered with a different orientation from other letters in the at least one word.

15. The computer program product of claim 14, wherein the preferred rich text format template is obtained based on a user profile associated with the user.

16. The computer program product of claim 15, wherein user profile includes a type and a level of dyslexia of the user and wherein the preferred rich text format template is determined based on the type and the level of dyslexia.

17. The computer program product of claim 14, wherein the program instructions executable by the processor further cause the processor to:

monitor the user as the user reads the customized view of the content item; and calculate a comfortable reading index based on a reading performance of the user.

18. The computer program product of claim 17, wherein the program instructions executable by the processor further cause the processor to:

based on a determination that the comfortable reading index is below a threshold level, iteratively:

adjust the preferred rich text format template that is applied and updating the customized view of the content item to the user;

evaluate the reading performance of the user; and calculate a new comfortable reading index based on the reading performance until the new comfortable reading index exceeds the threshold level.

\* \* \* \* \*